(12) United States Patent
Risko Cattell et al.

(10) Patent No.: US 11,035,412 B2
(45) Date of Patent: Jun. 15, 2021

(54) BEARING ASSEMBLY AND METHOD OF INSTALLATION

(71) Applicant: GM GLOBAL TECHNOLOGY OPERATIONS LLC, Detroit, MI (US)

(72) Inventors: Rebecca K. Risko Cattell, Ferndale, MI (US); Jack M. Gayney, Grosse Ile, MI (US); Hun J. Kim, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 16/151,744

(22) Filed: Oct. 4, 2018

(65) Prior Publication Data

US 2020/0109746 A1    Apr. 9, 2020

(51) Int. Cl.
*F16C 19/02*    (2006.01)
*F16C 35/07*    (2006.01)
*F16C 43/04*    (2006.01)

(52) U.S. Cl.
CPC .............. *F16C 35/07* (2013.01); *F16C 19/02* (2013.01); *F16C 43/04* (2013.01); *F16C 2226/12* (2013.01); *F16C 2226/80* (2013.01); *F16C 2326/06* (2013.01)

(58) Field of Classification Search
CPC ........ F16C 19/02; F16C 35/07; F16C 35/073; F16C 43/04; F16C 2326/66; F16C 2226/12; F16C 2226/78; F16C 2226/80; F16C 2326/06
USPC ....... 384/535, 564, 581, 583, 903, 542, 563, 384/584
See application file for complete search history.

(56) References Cited

U.S. PATENT DOCUMENTS 2,438,542 A * 3/1948 Cushman .............. F16C 33/516
                                                  416/147
3,621,958 A * 11/1971 Klemm ..................... F16B 1/04
                                                  192/223.3
(Continued)

FOREIGN PATENT DOCUMENTS

DE    102016219232 A1 *  4/2017  ................ F16C 3/06
EP         359659 A  *  3/1990  ............ F16C 35/073
(Continued)

*Primary Examiner* — Marcus Charles
(74) *Attorney, Agent, or Firm* — Vivacqua Crane

(57) ABSTRACT

A bearing assembly and method of installation. A ball bearing includes an outer race, an inner race, and a separate L-shaped sleeve. In one embodiment, the sleeve is comprised of an axially extending body and a radially extending flange. The axially extending body is configured to be located between an inner diameter of the inner race and a transmission shaft, and the radially extending flange is configured to be located between an inner side surface of the inner race and the transmission shaft. The L-shaped sleeve with splines makes it feasible to sequentially press fit both the inner race and the outer race of the ball bearing. The spline in the axially extending body of the sleeve can slip-fit with the transmission shaft, allowing for ease of assembly, and enabling a press-fit connection between the ball bearing outer race and housing. This arrangement can help reduce wear, particularly to the housing, and better control axial movement of the bearing assembly due to gear thrust load direction change during operation.

16 Claims, 2 Drawing Sheets

(56) References Cited

U.S. PATENT DOCUMENTS

| | | | | |
|---|---|---|---|---|
| 3,695,402 | A | * | 10/1972 | Klemm ................... F16B 1/04 |
| | | | | 192/223.1 |
| 4,138,168 | A | * | 2/1979 | Herlitzek ............. F16C 35/067 |
| | | | | 384/537 |
| 4,530,609 | A | * | 7/1985 | Jasperse ................ B65G 39/09 |
| | | | | 384/482 |
| 5,407,386 | A | * | 4/1995 | Kish ...................... B64C 27/12 |
| | | | | 464/99 |
| 5,833,374 | A | * | 11/1998 | Casaro ................... F16C 19/54 |
| | | | | 384/537 |
| 6,168,530 | B1 | * | 1/2001 | Guimbal ................ B64C 27/12 |
| | | | | 464/178 |
| 2005/0119077 | A1 | * | 6/2005 | Faucon ................ F16C 35/063 |
| | | | | 474/70 |
| 2009/0236813 | A1 | * | 9/2009 | Reid ....................... B62D 7/18 |
| | | | | 280/93.512 |

FOREIGN PATENT DOCUMENTS

| WO | WO-9418070 | A2 | * | 8/1994 | ............ B64C 27/12 |
| WO | WO-2016097188 | A1 | * | 6/2016 | ......... F04B 43/1261 |

\* cited by examiner

BEARING ASSEMBLY AND METHOD OF INSTALLATION

INTRODUCTION

The field of technology generally relates to bearing assemblies, and more particularly, to ball bearing assemblies for automotive transmissions.

Ball bearing assemblies are used in vehicle transmissions to help various components withstand radial and axial forces during operation of the gears. The bearing includes an inner race, an outer race, and a plurality of rollers or balls located between the inner race and the outer race. The outer race is oftentimes protected in a housing. Outer race movement can result in wear and loss of material in the bearing housing pocket, particularly if the housing is made of a softer metal material such as aluminum. In some instances, expensive coatings, shims, or an undesirable arrangement between the bearing housing and outer race are used to minimize this wear. The presently disclosed bearing assemblies provide a more robust, durable, and cost-effective solution.

SUMMARY

According to one embodiment, there is provided a bearing assembly. The bearing assembly includes an outer race having an outer diameter, an inner side surface, and an outer side surface. The bearing assembly also includes an inner race having an inner diameter, an inner side surface, and an outer side surface. The bearing assembly further includes a sleeve having an axially extending body and a radially extending flange. The axially extending body is configured to be located between the inner diameter of the inner race and a transmission shaft, and the radially extending flange is configured to be located between the inner side surface of the inner race and the transmission shaft.

According to various embodiments, this assembly may further include any one of the following steps or features or any technically-feasible combination of these steps or features:
  the axially extending body of the sleeve includes a spline configured to mate with a corresponding recess on the transmission shaft;
  the spline is a loose-fit spline located at an interface between the sleeve and the transmission shaft;
  the interface is a slip-fit interface;
  axial movement of the transmission shaft due to a gear thrust is focused at the slip-fit interface of the spline;
  the sleeve includes an inner diameter snap ring recess;
  an inner diameter snap ring installed in the inner diameter snap ring recess, wherein the inner diameter snap ring helps restrict axial movement of the inner race with respect to the sleeve;
  a radially extending portion of the inner diameter snap ring is located adjacent to the outer side surface of the inner race;
  further comprising a bearing housing press-fit to the outer diameter of the outer race;
  the sleeve is press-fit to the inner diameter of the inner race such that both the outer diameter of the outer race and the inner diameter of the inner race have a press-fit connection;
  the bearing housing includes an outer diameter snap ring recess;
  an outer diameter snap ring installed in the outer diameter snap ring recess, wherein the outer diameter snap ring helps restrict axial movement of the outer race with respect to the bearing housing;
  a radially extending portion of the outer diameter snap ring is located adjacent to the inner side surface of the outer race;
  an inner diameter snap ring installed in an inner diameter snap ring recess in the sleeve, wherein the inner diameter snap ring helps restrict axial movement of the inner race with respect to the sleeve;
  a plurality of balls between the outer race and the inner race; and/or
  the inner race, the outer race, and the plurality of balls comprise a deep groove ball bearing.

According to another embodiment, there is provided a bearing assembly comprising a bearing housing; an outer race having an outer diameter press-fit to the bearing housing; an inner race having an inner diameter; and a sleeve press-fit to the inner diameter of the inner race. The sleeve has an axially extending body and a spline located along the axially extending body. The axially extending body is configured to be located between the inner diameter of the inner race and a transmission shaft such that the spline is configured to mate with a corresponding recess on the transmission shaft. The spline is a loose-fit spline located at a slip-fit interface between the sleeve and the transmission shaft.

According to various embodiments, this assembly may further include a sleeve with a radially extending flange that is configured to be located between an inner side surface of the inner race and the transmission shaft.

According to yet another embodiment, there is provided a method of installing a bearing assembly to a transmission shaft of a vehicle, the bearing comprising: a bearing housing; an outer race having an outer diameter, an inner side surface, and an outer side surface; an inner race having an inner diameter, an inner side surface, and an outer side surface; and a sleeve having a radially extending flange and an axially extending body with a spline. The method comprises the steps of: press-fitting the inner diameter of the inner race to the axially extending body of the sleeve such that an inner side surface of the inner race is situated adjacent to the radially extending flange; press-fitting the bearing housing to the outer diameter of the outer race; and sliding the sleeve onto the transmission shaft so that the spline mates with a recess on the transmission shaft.

According to various embodiments, this method may further include that the spline is a loose-fit spline located at a slip-fit interface between the sleeve and the transmission shaft.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The bearing assembly described herein can advantageously control axial movement of the outer and inner races in a vehicle transmission. Minimizing axial movement of the outer and inner races can provide an anti-creep solution that prevents and/or mitigates wear in the bearing housing pocket. Embodiments of the bearing assembly include an L-shaped sleeve located between the transmission shaft and the bearing inner race. The L-shaped sleeve may include one or more splines that allow for a slip-fit connection between the sleeve and the transmission shaft. When the inner race is press-fit to the sleeve and the outer race is press-fit to the housing, axial movement due to gear thrust may advantageously be more focused at the spline interface, rather than at one of the bearing races. As compared to other implementations where the inner race is press-fit to the shaft and the outer race is loose-fit or clearance-fit with the housing, embodiments of the bearing assembly described herein can include press-fit connections at the outer and inner diameters of the outer and inner races, respectively, thereby providing more axial fixation of the races.

Figure 1:
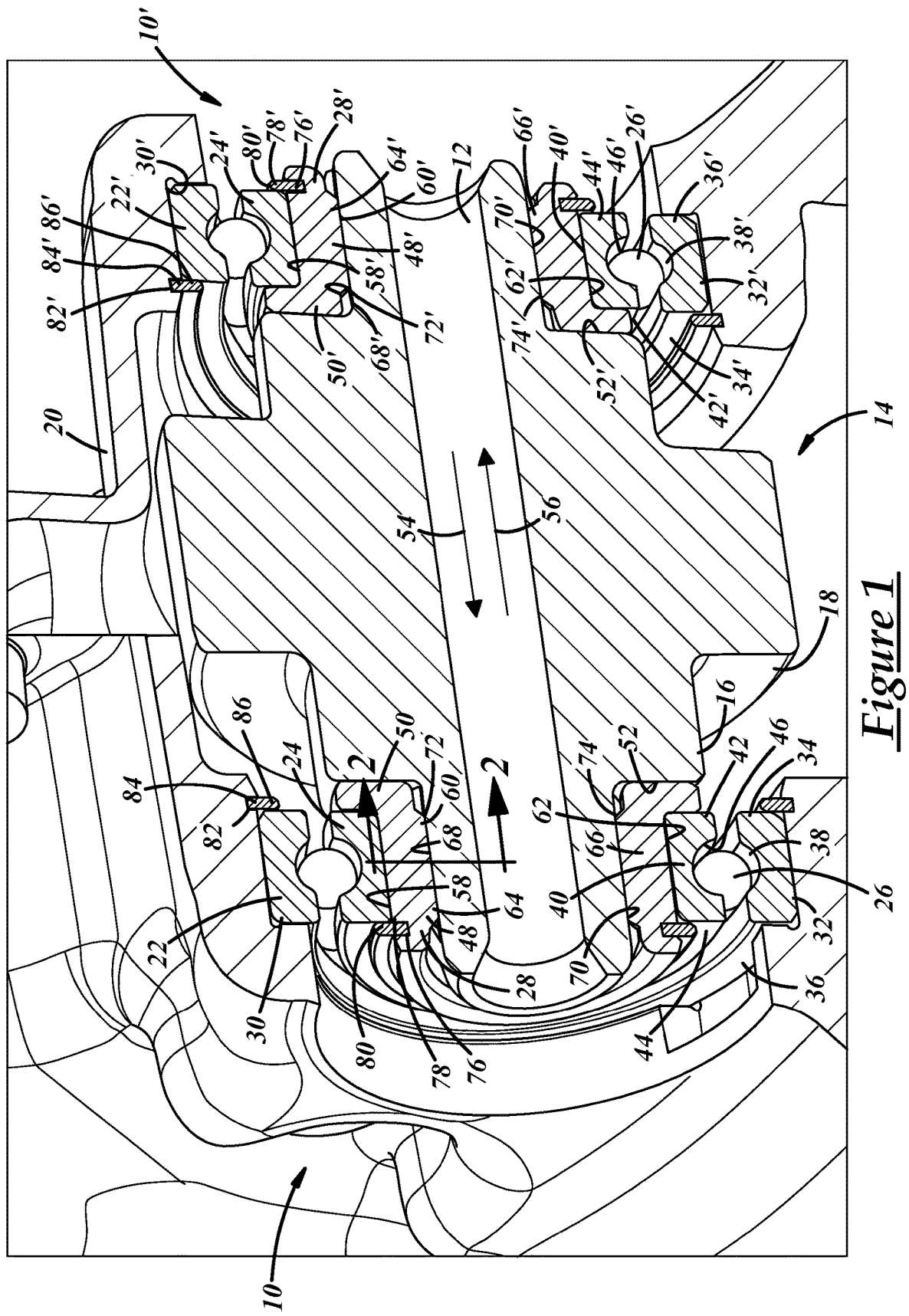
FIG. 1 is a partial, cross-section view of two bearing assemblies and a gear assembly.

FIG. 1 shows two bearing assemblies 10, 10'. While the majority of the description relates to the bearing assembly 10, such features are also applicable to bearing assembly 10' unless specifically mentioned or technically not feasible. The bearing assemblies 10, 10' surround a transmission shaft 12 of a vehicle transmission 14. In an advantageous embodiment, the vehicle transmission 14 is a parallel axes type automatic transmission drive with a number of shafts, clutches, drive gears etc. The bearing assembly 10 may be used in any operable automotive transmission type, such as electric, hybrid, manual, automatic, etc. A gear assembly 16 is mounted on the shaft 12 between the bearing assemblies 10, 10'. The gear assembly 16 includes a helical gear 18 (teeth not shown), which meshes with another gear (not shown). However, it should be understood that the bearing assemblies 10, 10' can be used to accommodate shafts holding any number of different gears having various configurations, mounting arrangements, etc. The transmission 14 and gear assembly 16 depicted in FIG. 1 is just one example.

The bearing assembly 10 generally includes a bearing housing 20, an outer race 22, an inner race 24, and balls or rollers 26 located between the outer race 22 and the inner race 24. Advantageously, a sleeve 28 is located between the transmission shaft 12 and the inner race 24. The L-shaped sleeve 28 helps direct and/or control axial movement of the inner race 24 and the outer race 22. In a preferred embodiment, the outer race 22, the inner race 24, and the balls 26 comprise a deep groove ball bearing. With a deep groove ball bearing, the dimensions of the races 22, 24 are closer to the dimensions of each of the balls 26, which can allow for the bearing assembly 10 to better accommodate high shaft speed and accompanying radial and axial loads.

The bearing housing 20 surrounds the outer races 22, 22' of the bearing assemblies 10, 10', and at least partially surrounds the gear assembly 16. The bearing housing 20 can help protect the outer race 22, the inner race 24, and the balls or rollers 26 from contaminants in the external environment. Oftentimes, the bearing housing 20 is made from a softer metal material such as aluminum. Using aluminum can decrease the weight of the assembly 10, 10', which is desirable in the automotive industry, although other materials for the bearing housing 20 are possible, such as cast iron. In bearing assembly embodiments that use an aluminum bearing housing, the aluminum may be more susceptible to wear. Accordingly, when the outer race 22 is loose-fit or clearance-fit, as is typical, movement of the outer race 22 can cause a greater amount of wear in the housing 20. As detailed further below, the bearing assemblies 10, 10' include a press-fit connection between the bearing housing 20 and the outer race 22, instead of a loose-fit or clearance-fit connection, thereby limiting axial movement in the bearing pocket 30. A "press-fit connection" is one in which the inner component (e.g., outer race 22) is larger or slightly larger than the outer component (e.g., bearing pocket 30 of bearing housing 20). The degree and tolerance of the press-fit connections described herein will vary depending on the types of materials being used, the relative sizes and desired performance qualities of the various components, etc.

The outer race 22 and the inner race 24 together form the cylindrical track for the balls 26. The outer race 22 has an outer diameter 32, an inner side surface 34, an outer side surface 36, with a groove 38 located between the inner side surface 34 and the outer side surface 36. Similarly, the inner race has an inner diameter 40, an inner side surface 42, an outer side surface 44, and a groove 46 located between the inner side surface 42 and the outer side surface 44. The races 22, 24 are typically made from bearing steel, although any operable material may be used. Through use of the sleeve 28, both the outer race 22 and the inner race 24 can be press-fit in the bearing assembly 10, thereby minimizing wear on the housing 20. Further, given the presence of the press-fit connection, electrically insulating or corrosion resistant coatings, for example, may perform better with the bearing assembly 10.

The sleeve 28 is an L-shaped sleeve that is configured to be located between the transmission shaft 12 and the inner race 24. The sleeve 28 may be made from steel or a hardenable steel alloy, or any other operable material, and includes an axially extending body 48 and a radially extending flange 50. "Axially extending" generally describes a component that is substantially, but not necessarily exactly, inline with the shaft 12, and "radially extending" generally describes a component that is substantially, but not necessarily exactly, orthogonal to the shaft 12. The axially extending body 48 is configured to be located between the inner diameter 40 of the inner race 24 and the transmission shaft 12. The radially extending flange 50 is configured to be located between the inner side surface 42 of the inner race 24 and the transmission shaft 12. More particularly, the radially extending flange 50 directly abuts a side wall 52 of the gear assembly portion 16 of the transmission shaft 12 such that the radially extending flange 50 is situated directly between the inner side surface 34 of the inner race 24 and the sidewall 52. With gear thrust, as designated by the arrows 54, 56, more load is thus focused on the sleeve 28 instead of the bearing races 22, 24.

Figure 2:
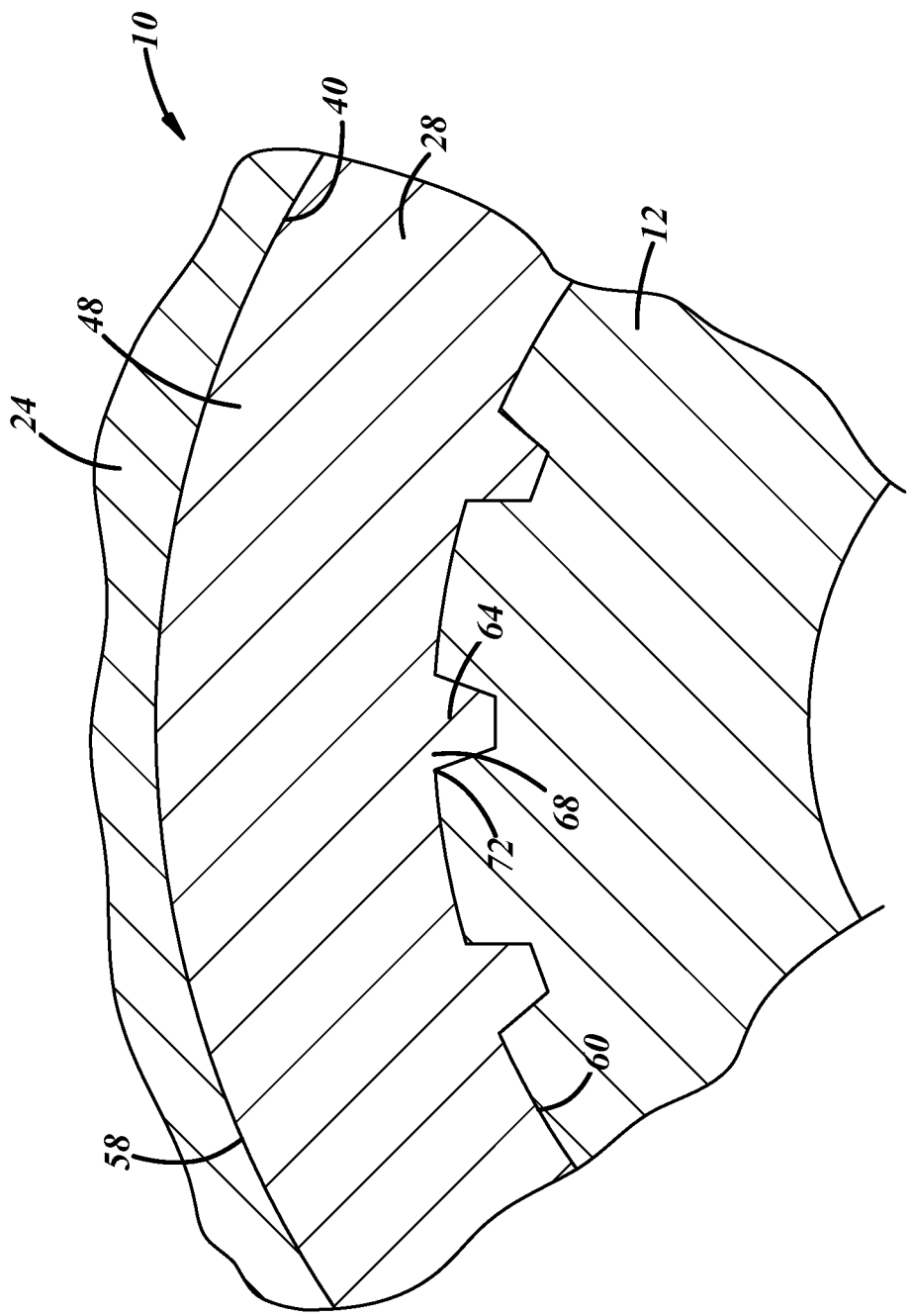
FIG. 2 is a partial, cross-section view of one of the bearing assemblies of FIG. 1, taken along line 2-2 in FIG. 1.

The axially extending body 48 includes a radially outward surface 58 and a radially inward surface 60. The radially outward surface 58 may include a recessed pocket 62 that abuts the radially extending flange 50. The recessed pocket 62 may help facilitate a tighter press-fit connection between the inner race 24 and the sleeve 28. The radially inward surface 60 of the axially extending body 48 includes splines 64, 66 that are configured to mate with corresponding recesses 68, 70 on the transmission shaft 12. At least two diametrically opposed splines 64, 66 are preferred, as they help to better focus axial movement and the arrangement of splines 64, 66 does not over constrain movement with respect to the shaft 12. However, more or less splines may be included depending on the desired implementation. The cross-section in FIG. 1 is taken through the center of each spline 64, 66, and FIG. 2 shows a partial cross-section view of the spline 64 and recess 68. Other non-labeled splines, as shown, may be included. Each spline 64, 66 is a loose-fit spline located at a slip-fit interface 72, 74 between the sleeve 28 and the transmission shaft 12. A "loose-fit" generally corresponds to ISO standard 4156. The "slip-fit" means that installation of the sleeve 28 is accomplished by sliding the sleeve 28 over the shaft 12. The slip-fit interface 72, 74 allows for easier installation, and, in some embodiments, there is no hardness mismatch at the interface 72, 74 so wear can be better controlled through heat treatment and/or material selection.

In an advantageous embodiment, each spline 64, 66 is integrally cut or formed into the sleeve 28, with each spline 64, 66 being a straight, cylindrical, involute spline that mates with a similarly shaped recess 68, 70 in the transmission shaft. This spline shape can help focus axial movement of the transmission shaft 12 due to gear thrust 54, 56 at the slip-fit interface 72, 74 of each spline 64, 66. Since some degree of axial movement is permitted between the sleeve 28 and the shaft 12 at the slip-fit interface 72, 74, the outer race 22 can be press-fit to the bearing housing 20 instead of being clearance-fit. This can reduce unwanted wear in the bearing housing 20. Further, with the two bearing assemblies 10, 10' illustrated, mirroring the radially extending flanges 50, 50' against the gear assembly 16 can further provide axial support to the bearing assembly 10, 10'. These structural, anti-creep properties may be more desirable than prior situations such as coatings which can wear, springs that can lose preload over time, or bolts or nuts that could potentially back out or loosen.

To help further restrict axial movement, the sleeve 28 includes an inner diameter snap ring recess 76 for accommodating an inner diameter snap ring 78. The inner diameter snap ring 78 helps restrict axial movement of the inner race 24 with respect to the sleeve 28. This may be accomplished via a radially extending portion 80 of the snap ring 78 that is located directly adjacent to the outer side surface 44 of the inner race 24. The bearing assembly 10 may also include an outer diameter snap ring recess 82 in the bearing housing 20 for accommodating an outer diameter snap ring 84. The outer diameter snap ring 84 helps restrict axial movement of the outer race 22 with respect to the bearing housing. This may be accomplished via a radially extending portion 86 of the outer diameter snap ring 84 that is located directly adjacent to the inner side surface 34 of the outer race 22. Accordingly, the outer race 22 may be constrained on either side by the outer diameter snap ring 84 and a radially extending flange in the bearing housing 20.

When installing the bearing assembly 10, the sleeve 28 can be slid onto the transmission shaft 12 so that each spline 64, 66 mates with the corresponding recess 68, 70 and the radially extending flange 50 abuts the sidewall 52 of the gear assembly 16 of the transmission shaft 12. The inner diameter 40 of the inner race 24 is press-fit to the radially outward surface 58 of the axially extending body 48 of the sleeve 28 such that the inner side surface 42 of the inner race 24 is situated directly adjacent to the radially extending flange 50. It is possible to press-fit the inner race 24 with the outer race 22 to the sleeve 28 before the sleeve is slid or slipped onto the transmission shaft 12. The bearing housing 20 can then be press-fit to the outer diameter 32 of the outer race 22. This press-fit connection of both the outer and inner races 22, 24 can improve wear characteristics of the bearing assembly 10.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A bearing assembly, comprising:
   an outer race having an outer diameter, an inner side surface, and an outer side surface;
   an inner race having an inner diameter, an inner side surface, and an outer side surface; and
   a sleeve having an axially extending body and a radially extending flange, wherein the axially extending body is configured to be located between the inner diameter of the inner race and a transmission shaft, and the radially extending flange extends directly between the inner side surface of the inner race and the transmission shaft.

2. The bearing assembly of claim 1, wherein the axially extending body of the sleeve includes a spline configured to mate with a corresponding recess on the transmission shaft.

3. The bearing assembly of claim 2, wherein the spline is a loose-fit spline located at an interface between the sleeve and the transmission shaft.

4. The bearing assembly of claim 3, wherein the interface is a slip-fit interface.

5. The bearing assembly of claim 4, wherein axial movement of the transmission shaft due to a gear thrust is focused at the slip-fit interface of the spline.

6. The bearing assembly of claim 1, wherein the sleeve includes an inner diameter snap ring recess.

7. The bearing assembly of claim 6, further comprising an inner diameter snap ring installed in the inner diameter snap ring recess, wherein the inner diameter snap ring helps restrict axial movement of the inner race with respect to the sleeve.

8. The bearing assembly of claim 7, wherein a radially extending portion of the inner diameter snap ring is located adjacent to the outer side surface of the inner race.

9. The bearing assembly of claim 1, further comprising a bearing housing press-fit to the outer diameter of the outer race.

10. The bearing assembly of claim 9, wherein the sleeve is press-fit to the inner diameter of the inner race such that both the outer diameter of the outer race and the inner diameter of the inner race have a press-fit connection.

11. The bearing assembly of claim 9, wherein the bearing housing includes an outer diameter snap ring recess.

12. The bearing assembly of claim 11, further comprising an outer diameter snap ring installed in the outer diameter snap ring recess, wherein the outer diameter snap ring helps restrict axial movement of the outer race with respect to the bearing housing.

13. The bearing assembly of claim 12, wherein a radially extending portion of the outer diameter snap ring is located adjacent to the inner side surface of the outer race.

14. The bearing assembly of claim 12, further comprising an inner dimeter snap ring installed in an inner diameter snap ring recess in the sleeve, wherein the inner diameter snap ring helps restrict axial movement of the inner race with respect to the sleeve.

15. The bearing assembly of claim 1, further comprising a plurality of balls between the outer race and the inner race.

16. The bearing assembly of claim 15, wherein the inner race, the outer race, and the plurality of balls comprise a deep groove ball bearing.

\* \* \* \* \*